United States Patent
Kuehl et al.

(10) Patent No.: US 9,619,682 B2
(45) Date of Patent: *Apr. 11, 2017

(54) DETECTOR LOGIC AND RADIO IDENTIFICATION DEVICE AND METHOD FOR ENHANCING TERMINAL OPERATIONS

(71) Applicant: Nokia Technologies Oy, Espoo (FI)

(72) Inventors: Carmen Kuehl, Dortmund (DE); Tommy Ginman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,985

(22) Filed: Jun. 17, 2015

(65) Prior Publication Data

US 2015/0310239 A1    Oct. 29, 2015

Related U.S. Application Data

(63) Continuation of application No. 10/592,811, filed as application No. PCT/IB2004/000813 on Mar. 19, 2004, now Pat. No. 9,084,116.

(51) Int. Cl.
*H04Q 5/22* (2006.01)
*G06K 7/10* (2006.01)
(Continued)

(52) U.S. Cl.
CPC ..... *G06K 7/10366* (2013.01); *G06K 19/0723* (2013.01); *G07C 9/00111* (2013.01); *H04W 12/08* (2013.01); *H04W 12/02* (2013.01)

(58) Field of Classification Search
None
See application file for complete search history.

(56) References Cited

U.S. PATENT DOCUMENTS

| 4,599,490 A | 7/1986 | Cornell et al. |
| 4,698,781 A | 10/1987 | Cockerell, Jr. |

(Continued)

FOREIGN PATENT DOCUMENTS

| CN | 1027611 C | 2/1995 |
| CN | 1260939 | 7/2000 |

(Continued)

OTHER PUBLICATIONS

Skipper, J., "Electronic Banking and Payments", The Institution of Electrical Engineers, IEE, Savoy Place, London, 1998, 6 pages.

(Continued)

*Primary Examiner* — Curtis King
(74) *Attorney, Agent, or Firm* — Locke Lord LLP

(57) ABSTRACT

An electronic device operable with a radio frequency identification device operable with a detector logic and a method for operating the electronic device with a radio frequency identification device and a detector logic is provided. Firstly, a detection event is registered by the detector logic. The detected event relates to an operation of the radio frequency identification device, which is applicable to transmit data to a counterpart radio frequency identification device. A detection signal is generated and issued by the detector logic in response to the registering and detection event, respectively, which detection signal is received by the electronic device. Then, the electronic device initiates one or more operations in response to the receiving of the detection signal.

20 Claims, 4 Drawing Sheets

(51) Int. Cl.
*G06K 19/07* (2006.01)
*G07C 9/00* (2006.01)
*H04W 12/08* (2009.01)
*H04W 12/02* (2009.01)

(56) References Cited

U.S. PATENT DOCUMENTS

| | | | |
|---|---|---|---|
| 4,821,309 A | 4/1989 | Namekawa | |
| 5,138,329 A | 8/1992 | Saarnimo et al. | |
| 5,345,596 A | 9/1994 | Buchenhorner et al. | |
| 5,497,140 A | 3/1996 | Tuttle | |
| 5,525,994 A | 6/1996 | Hurta et al. | |
| 5,577,266 A | 11/1996 | Takahisa et al. | |
| 5,625,669 A | 4/1997 | McGregor et al. | |
| 5,627,517 A | 5/1997 | Theimer et al. | |
| 5,729,594 A | 3/1998 | Klingman | |
| 5,815,811 A | 9/1998 | Pinard et al. | |
| 5,887,253 A | 3/1999 | O'Neil et al. | |
| 5,898,679 A | 4/1999 | Brederveld et al. | |
| 5,903,830 A | 5/1999 | Joao et al. | |
| 5,917,865 A | 6/1999 | Kopmeiners et al. | |
| 5,917,913 A | 6/1999 | Wang | |
| 5,943,624 A | 8/1999 | Fox et al. | |
| 6,002,984 A | 12/1999 | Aughenbaugh | |
| 6,011,976 A | 1/2000 | Michaels et al. | |
| 6,025,780 A | 2/2000 | Bowers et al. | |
| 6,101,375 A | 8/2000 | Tuttle et al. | |
| 6,104,290 A | 8/2000 | Naguleswaran | |
| 6,104,333 A | 8/2000 | Wood, Jr. | |
| 6,115,782 A | 9/2000 | Wolczko et al. | |
| 6,130,623 A | 10/2000 | Maclellan et al. | |
| 6,144,847 A | 11/2000 | Altschul et al. | |
| 6,144,848 A | 11/2000 | Walsh et al. | |
| 6,167,514 A | 12/2000 | Matsui et al. | |
| 6,175,860 B1 | 1/2001 | Gaucher | |
| 6,175,922 B1 | 1/2001 | Wang | |
| 6,236,186 B1 | 5/2001 | Helton et al. | |
| 6,282,039 B1 | 8/2001 | Bartlett | |
| 6,297,737 B1 | 10/2001 | Irvin | |
| 6,337,856 B1 | 1/2002 | Schanhals et al. | |
| 6,382,507 B2 | 5/2002 | Schilling | |
| 6,404,339 B1 | 6/2002 | Eberhardt | |
| 6,422,462 B1 | 7/2002 | Cohen | |
| 6,424,623 B1 | 7/2002 | Borgstahl et al. | |
| 6,424,706 B1 | 7/2002 | Katz et al. | |
| 6,434,159 B1 | 8/2002 | Woodward et al. | |
| 6,445,732 B1 | 9/2002 | Beamish et al. | |
| 6,456,039 B1 | 9/2002 | Lauper et al. | |
| 6,456,234 B1 | 9/2002 | Johnson | |
| 6,462,647 B1 | 10/2002 | Roz | |
| 6,466,771 B2 | 10/2002 | Wood, Jr. | |
| 6,483,106 B1 | 11/2002 | Ohtomo et al. | |
| 6,487,180 B1 | 11/2002 | Borgstahl et al. | |
| 6,488,209 B1 | 12/2002 | Hunt et al. | |
| 6,501,741 B1 | 12/2002 | Mikkonen et al. | |
| 6,512,919 B2 | 1/2003 | Ogasawara | |
| 6,539,422 B1 | 3/2003 | Hunt et al. | |
| 6,542,721 B2 | 4/2003 | Boesen | |
| 6,566,997 B1 | 5/2003 | Bradin | |
| 6,634,560 B1 | 10/2003 | Grabau | |
| 6,663,063 B2 | 12/2003 | Tatta | |
| 6,677,852 B1 | 1/2004 | Landt | |
| 6,681,120 B1 | 1/2004 | Kim | |
| 6,687,679 B1 | 2/2004 | Van Luchene et al. | |
| 6,690,402 B1 | 2/2004 | Waller et al. | |
| 6,697,375 B1 | 2/2004 | Meng | |
| 6,705,520 B1 | 3/2004 | Pitroda et al. | |
| 6,710,576 B1 | 3/2004 | Kaufman et al. | |
| 6,732,176 B1 | 5/2004 | Stewart et al. | |
| 6,754,559 B2 | 6/2004 | Itako | |
| 6,783,071 B2 | 8/2004 | Levine et al. | |
| 6,792,292 B1 | 9/2004 | Chatani | |
| 6,832,082 B1 | 12/2004 | Ramaswamy et al. | |
| 6,842,621 B2 | 1/2005 | Labun et al. | |
| 6,892,052 B2 | 5/2005 | Kotola et al. | |
| 6,892,082 B2 | 5/2005 | Boesen | |
| 6,895,502 B1* | 5/2005 | Fraser | G06Q 20/42 713/168 |
| 6,989,741 B2 | 1/2006 | Kenny et al. | |
| 6,996,402 B2 | 2/2006 | Logan et al. | |
| 7,020,474 B2 | 3/2006 | Scott | |
| 7,039,600 B1 | 5/2006 | Meek et al. | |
| 7,049,963 B2 | 5/2006 | Waterhouse et al. | |
| 7,098,770 B2 | 8/2006 | Charrat et al. | |
| 7,107,009 B2 | 9/2006 | Sairanen et al. | |
| 7,174,564 B1 | 2/2007 | Weatherspoon et al. | |
| 7,190,257 B2 | 3/2007 | Maltseff et al. | |
| 7,231,372 B1 | 6/2007 | Prange et al. | |
| 7,433,677 B2 | 10/2008 | Kantola et al. | |
| 7,452,040 B1 | 11/2008 | Burgess, III | |
| 7,565,108 B2 | 7/2009 | Kotola et al. | |
| 7,657,490 B1 | 2/2010 | Nakajima | |
| 7,933,589 B1 | 4/2011 | Mamdani et al. | |
| 8,233,881 B2 | 7/2012 | Kantola et al. | |
| 8,611,919 B2 | 12/2013 | Barnes, Jr. | |
| 2001/0046862 A1 | 11/2001 | Coppinger et al. | |
| 2001/0051915 A1 | 12/2001 | Ueno et al. | |
| 2002/0011519 A1 | 1/2002 | Shults, III | |
| 2002/0020743 A1 | 2/2002 | Sugukawa et al. | |
| 2002/0022483 A1 | 2/2002 | Thompson et al. | |
| 2002/0022504 A1 | 2/2002 | Horii | |
| 2002/0023215 A1 | 2/2002 | Wang et al. | |
| 2002/0026586 A1 | 2/2002 | Ito | |
| 2002/0032028 A1* | 3/2002 | Kaupe | H04B 7/18519 455/427 |
| 2002/0065065 A1 | 5/2002 | Lunsford et al. | |
| 2002/0080864 A1 | 6/2002 | Kuttruff et al. | |
| 2002/0106988 A1 | 8/2002 | Davie et al. | |
| 2002/0107742 A1 | 8/2002 | Magill | |
| 2002/0145039 A1 | 10/2002 | Carroll | |
| 2002/0154607 A1 | 10/2002 | Forstadius et al. | |
| 2002/0164994 A1 | 11/2002 | Lundberg | |
| 2002/0170961 A1* | 11/2002 | Dickson | G06K 7/0008 235/383 |
| 2002/0188863 A1 | 12/2002 | Friedman | |
| 2003/0008647 A1 | 1/2003 | Takatori et al. | |
| 2003/0030542 A1 | 2/2003 | Von Hoffmann | |
| 2003/0042316 A1 | 3/2003 | Teraura | |
| 2003/0051767 A1 | 3/2003 | Coccaro et al. | |
| 2003/0051945 A1 | 3/2003 | Coccaro et al. | |
| 2003/0055735 A1 | 3/2003 | Cameron et al. | |
| 2003/0093187 A1 | 5/2003 | Walker | |
| 2003/0114104 A1 | 6/2003 | Want et al. | |
| 2003/0135417 A1* | 7/2003 | Bodin | G06Q 20/12 705/16 |
| 2003/0141989 A1 | 7/2003 | Arisawa et al. | |
| 2003/0146821 A1* | 8/2003 | Brandt | G06Q 20/04 340/10.1 |
| 2003/0148775 A1* | 8/2003 | Spriestersbach | G06Q 10/10 455/456.1 |
| 2003/0171984 A1* | 9/2003 | Wodka | G06Q 20/387 705/14.25 |
| 2004/0002305 A1 | 1/2004 | Byman-Kivivuori et al. | |
| 2004/0012496 A1* | 1/2004 | De Souza | G06K 19/0723 340/572.3 |
| 2004/0012531 A1 | 1/2004 | Toda | |
| 2004/0039661 A1 | 2/2004 | Fuzell-Casey et al. | |
| 2004/0077313 A1* | 4/2004 | Oba | H04L 63/0492 455/41.2 |
| 2004/0077372 A1* | 4/2004 | Halpern | G06Q 20/32 455/550.1 |
| 2004/0092231 A1* | 5/2004 | Ayatsuka | G06F 21/31 455/41.2 |
| 2004/0093274 A1* | 5/2004 | Vanska | G01C 21/20 705/26.7 |
| 2004/0099738 A1 | 5/2004 | Waters | |
| 2004/0164166 A1 | 8/2004 | Mahany et al. | |
| 2005/0006466 A1* | 1/2005 | Overhultz | G06Q 30/02 235/383 |
| 2005/0017068 A1 | 1/2005 | Zalewski et al. | |
| 2005/0026635 A2 | 2/2005 | Michaels et al. | |
| 2005/0034029 A1 | 2/2005 | Ramberg et al. | |
| 2005/0037707 A1 | 2/2005 | Lewis | |

(56) References Cited

U.S. PATENT DOCUMENTS

| | | | |
|---|---|---|---|
| 2005/0040950 A1* | 2/2005 | Clucas | G08B 13/2448 340/572.1 |
| 2005/0040951 A1 | 2/2005 | Zalewski et al. | |
| 2005/0070257 A1* | 3/2005 | Saarinen | G07B 15/00 455/414.1 |
| 2005/0077356 A1 | 4/2005 | Takayama et al. | |
| 2005/0079817 A1 | 4/2005 | Kotola et al. | |
| 2005/0116050 A1 | 6/2005 | Jei et al. | |
| 2005/0134461 A1 | 6/2005 | Gelbman et al. | |
| 2005/0136886 A1* | 6/2005 | Aarnio | H04L 12/66 455/404.2 |
| 2005/0136949 A1 | 6/2005 | Barnes, Jr. | |
| 2005/0218230 A1 | 10/2005 | Amtmann et al. | |
| 2005/0237843 A1 | 10/2005 | Hyde | |
| 2005/0269411 A1 | 12/2005 | Vesikivi et al. | |
| 2006/0132310 A1 | 6/2006 | Cox et al. | |
| 2006/0145865 A1* | 7/2006 | Forster | G06K 19/0723 340/572.8 |
| 2006/0168644 A1 | 7/2006 | Richter et al. | |
| 2006/0244592 A1* | 11/2006 | Kansala | G06K 19/07703 340/571 |
| 2006/0280149 A1 | 12/2006 | Kuhl | |
| 2007/0063816 A1 | 3/2007 | Murakami et al. | |
| 2007/0080782 A1 | 4/2007 | Breitfuss | |
| 2007/0106558 A1* | 5/2007 | Mitchell | G06Q 20/0453 705/16 |
| 2007/0164118 A1* | 7/2007 | Degauque | G06K 7/0008 235/492 |
| 2007/0210162 A1* | 9/2007 | Keen | G06K 19/073 235/451 |
| 2007/0220273 A1* | 9/2007 | Campisi | G06K 9/00006 713/186 |
| 2007/0226151 A1* | 9/2007 | Baldischweiler | G06Q 20/04 705/61 |
| 2007/0236350 A1* | 10/2007 | Nystrom | G06F 17/30725 340/572.1 |
| 2008/0057867 A1 | 3/2008 | Trappeniers et al. | |
| 2008/0231428 A1 | 9/2008 | Kuhl | |
| 2009/0058618 A1 | 3/2009 | Gopalan et al. | |
| 2010/0273469 A1* | 10/2010 | Seban | G06K 19/07309 455/418 |
| 2011/0001827 A1* | 1/2011 | Ortiz | G07C 9/00087 348/156 |
| 2012/0225639 A1* | 9/2012 | Gazdzinski | G06Q 10/08 455/410 |

FOREIGN PATENT DOCUMENTS

| | | |
|---|---|---|
| CN | 1643806 | 7/2005 |
| EP | 0780802 | 6/1997 |
| EP | 1012793 | 6/2000 |
| EP | 1178445 | 2/2002 |
| EP | 1182833 | 2/2002 |
| EP | 1330075 | 7/2003 |
| EP | 1522955 | 4/2005 |
| EP | 1545069 | 6/2005 |
| EP | 1633104 | 3/2006 |
| EP | 1725977 | 11/2006 |
| GB | 2308947 | 9/1997 |
| GB | 2342010 | 3/2000 |
| GB | 2364457 | 1/2002 |
| JP | 09172409 | 6/1997 |
| JP | 2002058066 | 2/2002 |
| JP | 2002063652 | 2/2002 |
| JP | 2002271850 | 9/2002 |
| JP | 2005218127 | 8/2005 |
| WO | WO9300750 | 1/1993 |
| WO | WO9806214 | 2/1998 |
| WO | WO9858510 | 12/1998 |
| WO | WO9905659 | 2/1999 |
| WO | WO0065747 | 11/2000 |
| WO | WO0103311 | 1/2001 |
| WO | WO0139103 | 5/2001 |
| WO | WO0139108 | 5/2001 |
| WO | WO0145038 | 6/2001 |
| WO | WO0145319 | 6/2001 |
| WO | WO0180193 | 10/2001 |
| WO | WO0203625 | 1/2002 |
| WO | WO02/11074 | 2/2002 |
| WO | WO02071325 | 9/2002 |
| WO | WO02099715 | 12/2002 |
| WO | WO03007623 | 1/2003 |
| WO | WO03/019485 | 3/2003 |
| WO | WO03025834 | 3/2003 |
| WO | WO03061146 | 7/2003 |
| WO | WO03079281 | 9/2003 |
| WO | WO03081519 | 10/2003 |
| WO | WO03081787 | 10/2003 |
| WO | WO03/107112 | 12/2003 |
| WO | WO2004098089 | 11/2004 |
| WO | WO2004110017 | 12/2004 |
| WO | WO2008024531 | 2/2008 |

OTHER PUBLICATIONS

Office Action with translation dated Oct. 27, 2011 from Korean Application No. 10-2010-0064969, 5 pages.
Office Action dated Oct. 20, 2011 from Japanese Application No. 2009-229506, 4 pages.
File History for U.S. Appl. No. 10/592,739.
File History for U.S. Appl. No. 10/565,260.
Office Action with translation dated Jun. 30, 2011 from Chinese Application No. 038069717, 6 pages.
Office Action dated Jun. 27, 2011 from Canadian Application No. 2,533,029, 3 pages.
Zdravkovic, A., "Wireless Point of Sale Terminal for Credit and Debit Payment Systems", IEEE 1998, pp. 890-893.
Bisdikian, C., "An overview of the Bluetooth Wireless Technology", IEEE Communications Magazine, Dec. 2001, pp. 86-94.
Haselsteiner et al., "Security in Near Field Communication (NFC)", http://events.iaik.tugraz.atlRFIDSec06/Program/papers/002%20-%20Security%20IN%20NCF.pdf, downloaded from web Jul. 22, 2010.
Standard ECMA-340, Near Field Communication—Interface and Protocol (NFCIP-1), XP002290360, Dec. 2002.
Chinese Office Action dated Mar. 30, 2007 from Chinese Patent Application No. 03806971.7, pp. 1-17.
Chinese Office Action dated Dec. 28, 2007 from Chinese Patent Application No. 03806971.7, pp. 1-5.
Chinese Office Action dated Aug. 8, 2008 from Chinese Patent Application No. 03806971.7, pp. 1-8.
Chinese Office Action dated Jul. 31, 2009 from Chinese Patent Application No. 03806971.7, pp. 1-9.
Chinese Office Action dated Jul. 20, 2007 from Chinese Patent Application No. 03826782.9, pp. 1-18.
Chinese Office Action dated Mar. 21, 2008 from Chinese Patent Application No. 03826782.9, pp. 1-16.
Chinese Final Office Action dated Jul. 4, 2008 from Chinese Patent Application No. 03826782.9, pp. 1-16.
Chinese Office Action dated Mar. 20, 2009 from Chinese Patent Application No. 03826782.9, pp. 1-6.
Chinese Office Action dated Apr. 16, 2004 from Chinese Patent Application No. 01117943.0, pp. 1-9.
Chinese Office Action dated Jun. 17, 2005 from Chinese Patent Application No. 01117943.0, pp. 1-9.
Chinese Office Action dated Jun. 20, 2008 from Chinese Patent Application No. 2004800428485, pp. 1-9.
Chinese Office Action dated Dec. 12, 2008 from Chinese Patent Application No. 200480042848.5, pp. 1-6.
Great Britain Search Report dated Nov. 17, 2000 from British Application No. 00109835, pp. 1-3.
Great Britain Office Action dated Aug. 7, 2003 from British Application No. 0010983.5, pp. 1-2.
Great Britain Search Report dated Nov. 20, 2000 from British Application No. 0010982.7, pp. 1-2.
Great Britain Office Action dated Sep. 23, 2003 from British Patent Application No. 0010982.7, pp. 1-2.

(56) References Cited

OTHER PUBLICATIONS

Japanese Office Action dated Jun. 16, 2008 from Japanese Patent Application No. 2003-579374, pp. 1-3.
Japanese Final Office Action dated Jun. 1, 2009 from Japanese Patent Application No. 2003-579374, pp. 1-3.
Japanese Office Action dated May 7, 2008 from Japanese Patent Application No. 2005-504352, pp. 1-6.
Japanese Final Office Action dated Nov. 11, 2008 from Japanese Patent Application No. 2005-504352, pp. 1-6.
Korean Office Action dated Jun. 25, 2007 from Korean Patent Application No. 10-2006-7017374, pp. 1-2.
Korean Office Action dated Jan. 15, 2008 from Korean Patent Application No. 10-2006-7017374, pp. 1-5.
Korean Office Action dated Dec. 15, 2006 from Korean Patent Application No. 10-2006-7001417, pp. 1-7.
International Preliminary Examination Report dated Sep. 23, 2002 from Patent Cooperation Treaty Application No. PCT/EP01/03950, pp. 1-10.
Written Opinion dated Apr. 8, 2002 from Patent Cooperation Treaty Application No. PCT/EP01/03950, pp. 1-3.
International Search Report dated Nov. 9, 2001 from Patent Cooperation Treaty Application No. PCT/EP01/03950, pp. 1-6.
International Search Report dated Oct. 17, 2003 from Patent Cooperation Treaty Application No. PCT/IB03/00897, pp. 1-3.
International Preliminary Report on Patentability dated Jun. 27, 2005 from Patent Cooperation Treaty Application No. PCT/IB2003/002900, pp. 1-11.
International Search Report dated Feb. 11, 2004 from Patent Cooperation Treaty Application No. PCT/IB2003/002900, pp. 1-3.
International Preliminary Report on Patentability dated Sep. 20, 2006 from PCT Application No. PCT/IB2004/000784, 4pgs.
International Search Report and Written Opinion dated Oct. 22, 2004 from Patent Cooperation Treaty Application No. PCT/IB2004/000784. pp. 1-4.
International Search Report and Written Opinion dated Aug. 11, 2006 from Patent Cooperation Treaty Application No. PCT/US05/09066, pp. 1-13.
Intenational Invitation to Pay Additional Search Fees dated Apr. 24, 2006 from Patent Cooperation Treaty Application No. PCT/US05/09066, pp. 1-2.
File History for U.S. Appl. No. 09/848,515.
File History for U.S. Appl. No. 12/196,408.
File History for U.S. Appl. No. 10/105,320.
File History for US. Appl. No. 10/804,081.
File History for U.S. Appl. No. 09/848,459.
File History for U.S. Appl. No. 10/586,771.
File History for EP Application No. 09164761.0 retrieved from the European Patent Office Electronic File System on Apr. 18, 2011, 72 pages.
File History for EP Application No. 04721251.9 retrieved from the European Patent Office Electronic File System on Apr. 18, 2011, 485 pages.
File History for EP Application No. 03817515.4 retrieved from the European Patent Office Electronic File System on Apr. 18, 2011, 185 pages.
File History for EP Application No. 03744931.1 retrieved from the European Patent Office Electronic File System on Apr. 18, 2011, 211 pages.
File History for EP Application No. 01927886.0 retrieved from the European Patent Office Electronic File System on Apr. 18, 2011, 210 pages.
File History for EP Application No. 05725885.7 retrieved from the European Patent Office Electronic File System on Mar. 30, 2011, 206 pages.
Prabuddha Biswas et al., "Leveraging Location-Based Services for Mobile Applications", Oracle Corporation, Jun. 2001, 19 pages.
Inoue, A. et al, "A Ferroelectric Memory Embedded in a RFID Transponder with 2.4V Operation and 10 Year Retention at 70C", Consumer Electronics, 1997, Digest of Technical Papers, Date of Conference: Jun. 11-13, 1997, pp. 290-291 and abstract.
"News from Rohde & Schwarz", vol. 186, Nov. 2005, 64 pages.

* cited by examiner

State of the Art

DETECTOR LOGIC AND RADIO IDENTIFICATION DEVICE AND METHOD FOR ENHANCING TERMINAL OPERATIONS

This is a continuation of co-pending patent application Ser. No. 10/592,811 filed on Jun. 2, 2008 (hereby incorporated by reference), which is the U.S. National Stage of International application number PCT/IB2004/000813 filed on Mar. 19, 2004 which was published in English on Oct. 6, 2005 under International Publication number WO 2005/093644.

FIELD OF THE INVENTION

The present invention relates to short-range communication systems, more particularly to improvements in RF-tagging communication systems, wherein the present invention provides means in a portable consumer electronic device to indirectly and internally utilise radio frequency identification (RFID) information stored in connection within the radio frequency identification (RFID) module to enhance and direct subsequent terminal operation.

BACKGROUND

Radio frequency identification (RFID) technology relates basically to the field of local communication technology and more particularly local communication technology involving electromagnetic and/or electrostatic coupling technology. Electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency identification (RFID) tags and reader devices for radio frequency transponders also denoted for simplicity as radio frequency identification (RFID) readers.

Originally, radio frequency identification (RFID) technology has been developed and introduced for electronic article surveillance, article management purposes and logistics primarily for replacing bar code identification labels which are used for article management purposes and logistics up to now. A typical implementation of a state of the art radio frequency identification (RFID) transponder is shown with respect to FIG. 1. A typical radio frequency identification (RFID) transponder module 10 includes conventionally an electronic circuit, depicted exemplary as transponder logic 11, with data storage capacity, depicted herein as transponder memory 12, and a radio frequency (RF) interface 235 and high frequency (HF) interface, respectively, which couples an antenna 13 to the transponder logic 11. The radio frequency identification (RFID) transponders are typically accommodated in small containers. Depending on the requirements made on envisaged applications of the radio frequency identification (RFID) transponders (i.e. the data transmission rate, energy of the interrogation, transmission range etc.) different types are provided for data/information transmission at different radio frequencies within a range from several 10-100 kHz to some GHz (e.g. 134 kHz, 13.56 MHz, 860-928 MHz etc; only for illustration). Two main classes of radio frequency identification (RFID) transponders can be distinguished. Passive radio frequency identification (RFID) transponders are activated and energized by radio frequency identification (RFID) readers, which generate an interrogation signal, for example a radio frequency (RF) signal at a certain frequency. Active radio frequency identification (RFID) transponders comprise own power supplies such as batteries or accumulators for energizing.

On activation of a radio frequency identification (RFID) transponder by a radio frequency identification (RFID) reader, the informational contents stored in the transponder memory 12 are modulated onto a radio frequency (RF) signal, which is emitted by the antenna 13 of the radio frequency identification (RFID) transponder to be detected and received by the radio frequency identification (RFID) reader. Typical state of the art radio frequency identification (RFID) transponders correspond to radio frequency identification (RFID) standards such as the ISO 14443 type A standard or the Mifare standard. In accordance with the applicational purpose of a radio frequency identification (RFID) transponder, the information or data stored in the transponder memory may be either hard-coded or soft-coded. Hard-coded means that the information or data stored in the transponder memory 13 is predetermined and unmodifiable. Soft-coded means that the information or data stored in the transponder memory 13 is configurable by an external entity. The configuration of the transponder memory may be performed by a radio frequency (RF) signal via the antenna 13 or may be performed via a configuration interface, which allows for connection with the transponder memory 13.

More particularly, in the case of a passive radio frequency identification (RFID) transponder (i.e., having no local power source), the radio frequency identification (RFID) transponder is conventionally energized by a time-varying electromagnetic radio frequency (RF) signal/wave generated by the interrogating radio frequency identification (RFID) reader. When the radio frequency (RF) field passes through the antenna coil associated with the radio frequency identification (RFID) transponder, a voltage is generated across the coil. This voltage is ultimately used to energize the radio frequency identification (RFID) transponder, and enables back transmission of information from the radio frequency identification (RFID) transponder to the radio frequency identification (RFID) reader, which is sometimes referred to as back-scattering.

Interest in various radio frequency (RF) tagging technologies has recently grown significantly resulting to development of various radio frequency (RF) tagging applications outside the conventional manufacturing line and electronic article surveillance applications.

As RF-tagging technologies are considered to become as one technology providing short-range interaction applications in the near future, especially in mobile communication environment, the basic nature of the RF-tagging technologies (passive communication, no means for "true" duplex data transfer) is becoming more of an issue to be considered in connection with applications relating to interactivity.

As soon as a portable device equipped with a radio frequency identification (RFID) transponder logic receives an interrogation signal upon entering into a coverage area of radio frequency identification (RFID) reader device, the radio frequency identification (RFID) transponder responds to the interrogation signal by back-transmitting of radio frequency (RF) signals embedding data stored in connection with the radio frequency identification (RFID) transponder. The radio frequency identification (RFID) reader device may be capable of initiating or providing various services or applications based on the data received from the radio frequency identification (RFID) transponder. However, the portable device equipped with a conventional radio frequency identification (RFID) transponder circuit does not have any means to determine whether the data of the radio frequency identification (RFID) transponder have been read by the external radio frequency identification (RFID) reader device for performing subsequent operations based on this determination.

Moreover, when considering various transaction applications (such as ticketing services) security and privacy issues relating especially to ticket redemption process needs to taken into account. For instance a user may have purchased a mass transit ticket valid for a certain time-period or a serial ticket with multiple one-way- or roundtrips. When such a ticket is implemented by way of a radio frequency identification (RFID) transponder providing the ticket information, the information typically includes some private user-related information (e.g. social-security number, date of birth, customer identification or like) and/or other confidential and secure information (e.g. ticket identifier or like). Such sensitive information is preferably kept secret in order to prevent possible misuse. In order to keep such sensitive information hidden (invisible) to any potentially hostile radio frequency identification (RFID) reader devices, it would be advantageous if the mobile terminal equipped with the radio frequency identification (RFID) transponder circuit, which is capable to determine whether the data sorted in the radio frequency identification (RFID) transponder has been read-out in order to remove the sensitive data from the radio frequency identification (RFID) transponder to enhance security.

SUMMARY

Accordingly, the object of the present invention is to provide an implementation and a method, on the basis of which a detection of a read access to a radio frequency identification (RFID) transponder by a corresponding reader device is detectable and analyzable.

In particular, the present invention is directed to provide back-end logic for allowing the radio frequency identification (RFID) transponder circuit to provide information relating to a reading process of the transponder information stored in the radio frequency identification (RFID) transponder.

More particularly, the present invention is further directed to allow a portable device equipped with a radio frequency identification (RFID) transponder circuit and having a detector logic for performing subsequent operations based on a detection determination. The subsequent operations may comprise for instance the operation or initiation of a particular predefined service(s) and application(s) corresponding to the read radio frequency identification (RFID) transponder data, respectively.

Advantageously, the present invention provides means and methods for enhancing interaction and services by means of providing internal input within a terminal device to initiate processes relating to certain services and applications. Moreover, the present invention provides beneficially means and methods for enhancing security and privacy issues in relation to transaction service especially in connection with ticketing applications.

According to a first aspect of the present invention, a radio frequency identification device and means operable with a detector logic is provided, respectively. The radio frequency interface is configured to receive a radio frequency interrogating signal from a counterpart radio frequency identification device such as a reader, which for instance retrieves from the radio frequency identification device in question. The controller circuit supplies data to the radio frequency interface in consequence of the receiving of the interrogating signal in order to transmit a radio frequency response signal carrying the data to the counterpart radio frequency identification device. The radio frequency identification device comprises further a detector logic. The detector logic is configured to generate a detection signal responsive to one or more detection events, which are defined in view of the operation and operational mode of the radio frequency identification device, respectively. The generated detection signal is provided to be supplied via a detection signal output to an electronic device having a corresponding detection signal input.

According to an embodiment of the present invention, the detection event may be constituted by detecting the receiving of an interrogating signal by the radio frequency interface; energizing the radio frequency identification device in response to receiving an interrogating signal; supplying data to the radio frequency interface in response to the receiving an interrogating signal; transmitting radio frequency response signal(s) via the antenna; or attenuating the radio frequency identification device subsequent to transmitting radio frequency response signal(s). The detection events applicable with the detector logic may not be limited to the aforementioned list. Further detection events are possible.

According to another embodiment of the present invention, the radio frequency identification device is operable with radio frequency identification reader functionality and radio frequency identification transponder functionality. Alternatively, the radio frequency identification device may be a radio frequency identification transponder.

According to another embodiment of the present invention, the radio frequency identification device is operable with radio frequency identification transponder functionality to emulate a radio frequency identification transponder. This means for instance that the radio frequency identification device may emulate a radio frequency identification transponder, in particular a passive radio frequency identification transponder, in case the radio frequency identification device is unpowered. Otherwise, i.e. in case the radio frequency identification device is powered by for example an external power source, the radio frequency identification device is operable with radio frequency identification reader functionality.

According to yet another embodiment of the present invention, the detector logic is at least connectable with the radio frequency identification device and in particular, with the radio frequency interface, the antenna or the controller logic. In particular, the detector logic may be provided internally to the radio frequency identification device or the detector logic may provided externally to the radio frequency identification device. More particularly, the detector logic is provided integrally with one of the components forming the radio frequency identification device; i.e. for instance the radio frequency interface, the antenna, and the controller logic, respectively. Further, the detector logic may be connectable to and provided integrally with any other (structural or functional) component of the radio frequency identification device, respectively, such as a data interface, a data storage (data memory) etc.

According to a further embodiment of the present invention, the radio frequency identification device comprises a configurable data storage, i.e. a configurable memory.

According to a second aspect of the present invention, a detector logic operable with a radio frequency identification device is provided. The radio frequency interface is configured to receive a radio frequency interrogating signal from a counterpart radio frequency identification device such as a reader, which for instance retrieves from the radio frequency identification device in question. The controller circuit supplies data to the radio frequency interface in consequence of the receiving of the interrogating signal in order to transmit a radio frequency response signal carrying the data to counterpart radio frequency identification means. The detector logic is operable with the radio frequency identification device. In detail, the detector logic is configured to generate a detection signal responsive to one or more detection events, which are defined in view of the operation and operational mode of the radio frequency identification device, respectively. The generated detection signal is provided to be supplied via a detection signal output to an electronic device having a corresponding detection signal input.

According to an embodiment of the present invention, the detection event may be constituted by the detection of receiving an interrogating signal by the radio frequency interface; energizing the radio frequency identification device in response to receiving an interrogating signal; supplying data to the radio frequency interface in response to receiving an interrogating signal; transmitting radio frequency response signal(s) via the antenna; or attenuating the radio frequency identification device subsequent to transmitting the radio frequency response signal(s). The detection events applicable with the detector logic may not be limited to the aforementioned list. Further detection events are possible.

According to a further embodiment of the present invention, the radio frequency identification device is operable with radio frequency identification reader functionality and radio frequency identification transponder functionality. Alternatively, the radio frequency identification device may be a radio frequency identification transponder.

According to a further embodiment of the present invention, the radio frequency identification device is operable with radio frequency identification transponder functionality to emulate a radio frequency identification transponder. This means for instance that the radio frequency identification device may emulate a radio frequency identification transponder, in particular a passive radio frequency identification transponder, in case the radio frequency identification device is unpowered. Otherwise, i.e. in case the radio frequency identification device is powered by for example an external power source, the radio frequency identification device is operable with radio frequency identification reader functionality.

According to another embodiment of the present invention, the detector logic is at least connectable with the radio frequency identification device. In particular, the detector logic is connectable with the radio frequency interface, the antenna or the controller logic of the radio frequency identification device. In particular, the detector logic may be provided internally to the radio frequency identification device or the detector logic may provided externally to the radio frequency identification device. More particularly, the detector logic is provided integrally with one of the components forming the radio frequency identification device; i.e. for instance the radio frequency interface, the antenna, and the controller logic, respectively. Further, the detector logic may be connectable to and provided integrally with any other (structural or functional) component of the radio frequency identification device, respectively, such as a data interface, a data storage (data memory) etc.

According to yet another embodiment of the present invention, the detector logic comprises a radio frequency interface with an antenna. The radio frequency interface of the detector logic is operable at one or more radio frequencies, at which the radio frequency identification device is operable. This means, the detector logic is operable independently from the radio frequency identification device but enables to detect the operation of the radio frequency identification device on the basis of the radio frequency signals sensed via the radio frequency interface of the detector logic.

According to a third aspect of the present invention, an electronic device operable with a radio frequency identification device and a detector logic is provided. The radio frequency interface is configured to receive a radio frequency interrogating signal from a counterpart radio frequency identification device such as a reader, which for instance retrieves from the radio frequency identification device in question. The controller circuit supplies data to the radio frequency interface in consequence of the receiving of the interrogating signal in order to transmit a radio frequency response signal carrying the data to counterpart radio frequency identification means. The detector logic is operable with the radio frequency identification device. In detail, the detector logic is configured to generate a detection signal responsive to one or more detected events, which are defined in view of the operation and operational mode of the radio frequency identification device, respectively. The generated detection signal is provided to be supplied via a detection signal output to an electronic device having a corresponding detection signal input. The electronic device comprises a detection signal input to receive the detection signal issued in consequence of the detected event as described above and one or more operations. The one or more operations are performed by the electronic device in consequence of and subsequent to the receiving the detection signal supplied to the detection signal input, respectively.

According to an embodiment of the present invention, the electronic device is provided with one or more associations between several contexts and a plurality of operations. The contexts relate to different operational contexts. The associations enable to select the one or more operations from the plurality of operations comprised by the associations in accordance with a current operational context of the electronic device. This means, the selected one or more operations are associated with the current operational context of the electronic device.

According to an embodiment of the present invention, the detected event may be constituted by detecting the receiving of an interrogating signal by the radio frequency interface; energizing the radio frequency identification device in response to receiving an interrogating signal; supplying data to the radio frequency interface in response to receiving an interrogating signal; transmitting radio frequency response signal(s) via the antenna; or attenuating the radio frequency identification device subsequent to transmitting radio frequency response signal(s). The detection events applicable with the detector logic may not be limited to the aforementioned list. Further detection events are possible.

According to another embodiment of the present invention, the one or more operations are predefined. In particular, the one or more operations relate to services and/or applications, i.e. the one or more operations may initiate, control or configure the service and applications and functions thereof.

According to an embodiment of the present invention, the operational context can be obtained from a type information. In particular, the type information relates to the contents of the data stored and transmitted by the radio frequency identification device, respectively.

According to yet another embodiment of the present invention, the operational context can be obtained from context information, which is applicable to define the current operational context of the electronic device. This means, the operational context represents for instance an environmental context, in accordance with which the operation of the electronic device is adaptable.

According to a further embodiment of the present invention, the context information is provided by external source entities. Additionally or alternatively, the context information is obtainable from information provided by said external source entities. The context information results from the provided information.

According to yet a further embodiment of the present invention, the electronic device is a portable consumer electronic device, in particular a processor-based device or more particularly a terminal device.

According to a fourth aspect of the present invention, a system is provided, which comprises an electronic device according to an aforementioned embodiment, a radio frequency identification device according to an aforementioned embodiment and a detector logic according to an aforementioned embodiment.

According to a sixth aspect of the present invention, a method for operating an electronic device operable with a radio frequency identification device operable with a detector logic is provided. Firstly, a detection event is registered and detected by the detector logic, respectively. The detected event relates to an operation of the radio frequency identification device, which is applicable to transmit data to counterpart radio frequency identification means. A detection signal is generated and issued by the detector logic in consequence of the registering and detection event, respectively, which detection signal is received by the electronic device. Then, the electronic device initiates one or more operations in response to the receiving of the detection signal.

According to an embodiment of the present invention, the electronic device is provided with one or more associations between several contexts and a plurality of operations. On the basis of a current operational context, the one or more operations are selected from the plurality of operations comprised by the associations. This means, the selected one or more operations are associated with the current operational context of the electronic device.

According to an embodiment of the present invention, the detector logic registers a detection event, when an interrogating signal is received by the radio frequency interface of the radio frequency identification device; the radio frequency identification device is energized in response to the receiving of the interrogating signal; the data is supplied to the radio frequency interface in response to the receiving of the interrogating signal; a radio frequency response signal is generated by the radio frequency identification device and emitted via a antenna coupled to the radio frequency interface; or the radio frequency identification device attenuates after the transmission of the radio frequency response signal.

According to another embodiment of the present invention, the one or more operations are predefined. In particular, the one or more operations relate to service and/or applications operable, applicable and performable by the electronic device, respectively.

According to yet another embodiment of the present invention, the operational context is obtained from a type information. In particular, the type information relates to contents of the data, which is stored transmitted by the radio frequency identification device, respectively.

According to a further embodiment of the present invention, the operational context is obtained from context information. That means, the context information is applicable to define the operational context of the electronic device.

According to yet a further embodiment of the present invention, information is obtained from an external source entity. The obtained information serves as the context information to define the operational context. Alternatively and/or additionally, information is obtained from the external source entity. The obtained information is analyzed and context information is obtained from the analyzing results.

According to an eighth aspect of the invention, computer program product for executing a method for operating an electronic device operable with a radio frequency identification device operable with a detector logic is provided. The computer program product comprises program code sections for carrying out the steps of the method according to an aforementioned embodiment of the invention, when the program is run on a controller, processor-based device, a computer, a terminal, a network device, a mobile terminal, or a mobile communication enabled terminal. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a ninth aspect of the invention, a computer program product is provided, which comprises program code sections stored on a machine-readable medium for carrying out the steps of the method according to an aforementioned embodiment of the invention, when the computer program product is run on a controller, processor-based device, a computer, a terminal, a network device, a mobile terminal, or a mobile communication enabled terminal.

According to a tenth aspect of the invention, a software tool is provided. The software tool comprises program portions for carrying out the operations of the aforementioned methods when the software tool is implemented in a computer program and/or executed.

According to a eleventh aspect of the invention, a computer data signal embodied in a carrier wave and representing instructions is provided which when executed by a processor cause the steps of the method according to an aforementioned embodiment of the invention to be carried out.

BRIEF DESCRIPTION OF THE DRAWINGS

In the following, the present invention will be described in greater detail with reference to embodiments and the accompanying drawings, in which.

DETAILED DESCRIPTION OF EMBODIMENTS OF THE INVENTION

Figure 1:
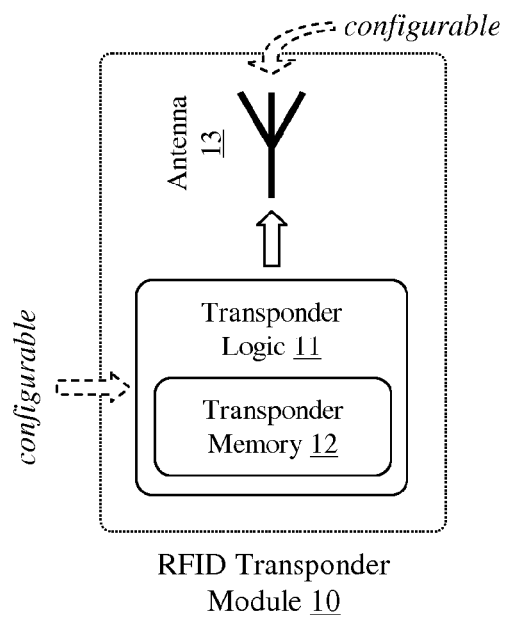
FIG. 1 shows schematically a typical internal structure of a state of the art RFID transponder.

Throughout the detailed description and the accompanying drawings same or similar components, units or devices will be referenced by same reference numerals for clarity purposes.

In principle, the below description referring to embodiments of the present invention will illustrate different implementational concepts for realizing and/or implementing detection functionality to RFID transponders. More detailed, the illustrated embodiments of the present invention purposes to implement back-end logic units serving for the detection functionality. In particular, in a first embodiment a detector logic is provided for being implemented supplementary to a RFID transponder, in a second embodiment a detector logic is provided to be integrated into a RFID transponder and in a third embodiment a detector logic is provided to be integrated into a RFID module supporting RFID transponder functionality and RFID reader functionality.

It shall be noted that the described embodiments serve as examples to illustrate the inventive concept, on the basis of which the detection functionality will be described in detail. Those skilled in the art will immediately appreciate on the basis of the description below that the inventive concept is applicable to similar and related short-range communication technologies being based on electromagnetic and/or electrostatic coupling.

Figure 2A:
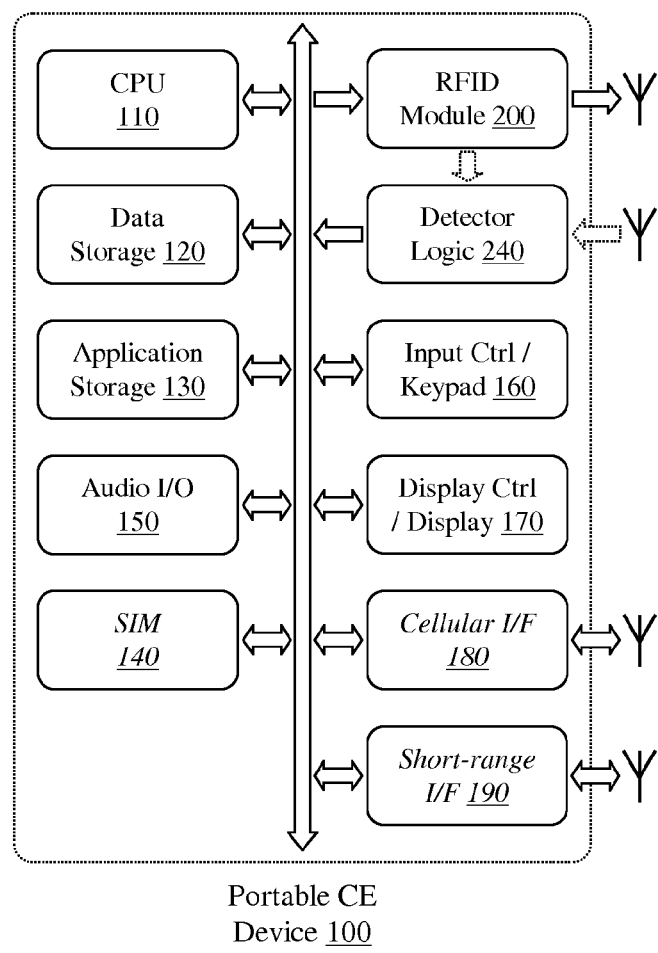
FIG. 2a shows schematically an implementation of a conventional electronic microprocessor-based device, which includes additionally a RFID transponder and a detector logic according to an embodiment of the present invention.

FIG. 2a illustrates schematically an implementation of a portable consumer electronic (CE) device being equipped with a RFID transponder and a detector logic according to an embodiment of the present invention.

The block diagram of FIG. 2a illustrates a principle structure design of a cellular terminal, which should exemplary represent any kind of portable CE device 100 in the sense of the present invention. It shall be understood that the present invention is not limited to any specific kind of portable CE device. The illustrated cellular terminal comprises typically a central processing unit (CPU) 110, a data storage 120, an application storage 130, input/output means including audio input/output (I/O) means 150, a keypad with input controller (Ctrl) 160 and a display with display controller (Ctrl) 170. A cellular interface (I/F) 180 coupled to a cellular antenna provides for an over-the-air interface, which serves in conjunction with a subscriber identification module (SIM) 140 for cellular communications with a corresponding radio access network (RAN) of a public land mobile network (PLMN).

A short-range interface (I/F) 190 or short-range transceiver may be additionally implemented in portable CE device 100 to provide for local data communication with a corresponding counterpart network, base station or transceiver. In general, the short-range interface (I/F) 190 can be realized by a low-power radio frequency transceiver such as a Bluetooth transceiver, a WLAN (wireless local area network) transceiver, a ultra-wide band transceiver or any other transceiver operable with a IEEE 802.xx standard. Moreover, the short-range interface (I/F) 190 can be also implemented as a infrared-based interface such as a IrDA (infrared direct access) interface or an interface being based on radio frequency identification (RFID) technology, namely RFID reader, RFID transponder and near field communication standard, respectively.

The cellular interface (I/F) 180 is arranged as a cellular transceiver to receive signals from the cellular antenna, decodes the signals, demodulates them and also reduces them to the base band frequency. The output of the cellular interface (I/F) 180 thus consists of a stream of data that may require further processing by the central processing unit (CPU) 110. The cellular interface (I/F) 180 arranged as a cellular transceiver also receives data from the central processing unit (CPU) 110, which are to be transmitted via the over-the-air interface to the radio access network (RAN). Therefore, the cellular interface (I/F) 180 encodes, modulates and up converts the signal to the radio frequency, which is to be used. The cellular antenna then transmits the resulting radio frequency signal to the corresponding radio access network (RAN) of the public land mobile network (PLMN).

The display and display controller (Ctrl) 170 are controlled by the central processing unit (CPU) 110 and provides information for the user typically by the means of a user interface. The keypad and keypad controller (Ctrl) 160 are provided to allow the user to input information. The information input via the keypad is supplied to the central processing unit (CPU) 110, which may be controlled in accordance with the input information. The audio input/output (I/O) means 150 includes at least a speaker for reproducing an audio signal and a microphone for recording an audio signal. The central processing unit (CPU) 110 may control the conversion of audio data to audio output signals and the conversion of audio input signals into audio data, where the audio data have a suitable format for cellular transmission.

The RFID transponder module 200 is operable with the aforementioned portable CE device 100 embodied as cellular phone for the way of illustration. In principle, the illustrated RFID transponder module 200 includes a transponder logic, which servers for the operation of the RFID transponder module 200, a transponder memory for storing data and information for being communicated via the RFID transponder module 200 and an antenna of the RFID transponder module. The detailed set-up and the operation may correspond to the set-up and the operation of a conventional passive RFID transponder. That means that the transponder logic is connected to the antenna via a radio frequency (RF) interface and a high frequency (HF) interface, respectively and the antenna is adapted to the predetermined radio frequency/frequencies deployed for operating. On reception of an interrogation signal by the antenna, the RFID transponder module 200 is energized and emits a respond signal, which codes the data stored in the transponder memory. The interrogation signal is conventionally emitted by a correspondingly adapted RFID reader, which emits the interrogation signal is set the RFID transponder module 200 into operation in order to consequently receive the response signal, which emission is effected by the energizing of the RFID transponder module 200.

Additionally, the illustrative portable CE device 100 comprises a detector logic 240. The detector logic 240 is responsible to detect the operation of the RFID transponder module 200. That means the detector logic 240 provides a signal on detection of the operation of the RFID transponder module 200 to be supplied to the logic of the portable CE device 100, in particular to the central processing unit (CPU) 110 for being further processed.

To allow the detection operation, the detector logic 240 can be coupled to the RFID transponder module 200 for sensing the operational state thereof. Correspondingly, the detector logic 240 should be able to at least sense the reception of an interrogating signal received via the antenna of the RFID transponder module 200 or the energizing of the transponder logic effected by the electromagnetic coupling-in of an interrogating signal.

Alternatively, the detector logic 240 can also be provided with a detector antenna and detector radio frequency (RF) interface connected to the detector antenna. In case the detector antenna is adapted to the operation frequency/frequencies of the RFID transponder module 200, an interrogating signal dedicated to activate the RFID transponder module 200 couples likewise into the detector antenna, which is detectable via the detector radio frequency (RF) interface. Hereby, the detector logic 240 is also capable to supply a detection signal to the portable CE device 100 and to the central processing unit (CPU) 110, respectively, to allow for further processing.

More detailed embodiments of the detector logic 240 and more detailed detection signal processing will be discussed with reference to the following figures.

Figure 2B:
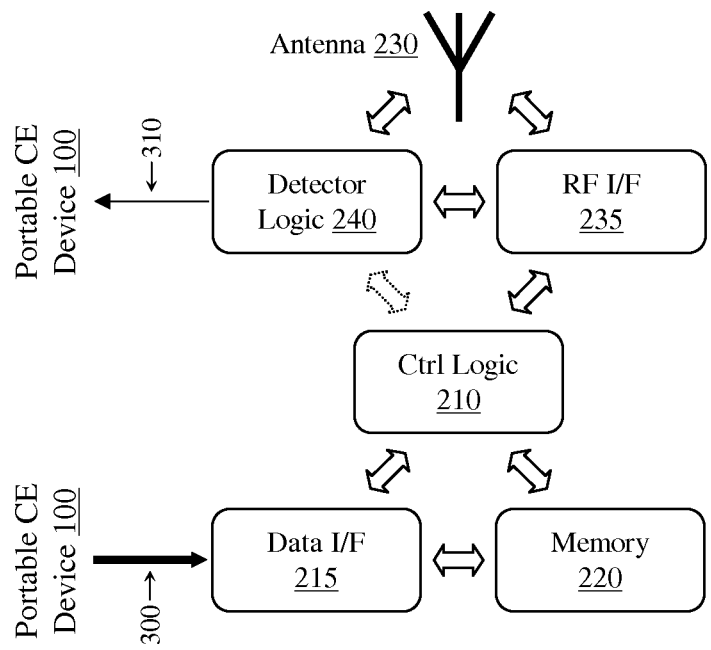
FIG. 2b shows schematically an implementation of a RFID transponder with a detector logic according to an embodiment of the present invention.

FIG. 2b illustrates schematically an implementation of a RFID transponder module with detector logic according to an embodiment of the present invention. The RFID transponder module of FIG. 2b is adapted to be connectable with any kind of portable CE device; particularly, a portable CE device 100 as described above. The illustrated RFID transponder module may be embodied with a configurable transponder memory 220.

In detail, the illustrated RFID transponder module includes a transponder logic 210, which serves for the operation of the RFID transponder module, a transponder memory 220 for storing data and information for being communicated via the RFID transponder module and an antenna 230. The transponder logic 210 is connected to the antenna 230 via a radio frequency (RF) interface 235 and a high frequency (HF) interface, respectively (not shown) and the antenna 230 is adapted to the predetermined radio frequency (RF) deployed for operating.

The radio frequency (RF) interface 235 and antenna 230 are adequately adapted to receive one or more interrogation signals and to transmit one or more response signals carrying information retrieved from the transponder memory 220.

The antenna 230 is connected to the radio frequency (RF) interface 235, which supplies RF/HF signals generated by the radio frequency (RF) interface 235 to the antenna 230 and which accepts RF/HF signals received by the antenna 230. The radio frequency (RF) interface 235 is responsible for both modulating and demodulating of the signals to be transmitted and received by the antenna 230, respectively.

The radio frequency (RF) interface 235 is typically capable to transmit demodulated signals to the transponder logic 210 and to receive signals from the transponder logic 210 to be modulated and transmitted. More particularly, the radio frequency (RF) interface 235 provides further signals necessary for the operation of the transponder logic 210, which are in detail a power supply signal (voltage signal) and a clock signal. The power supply signal is obtained from the coupling of the interrogating electromagnetic field into the antenna 230, whereas the clock signal is obtained from the demodulator comprised in the radio frequency (RF) interface 235. The power supply signal and the clock signal are obligate for operating the transponder logic 210, which is energized by interrogating signal emitted by an external interrogating entity, preferably, a RFID reader.

The transponder logic 210 is coupled to an interface, herein data interface (I/F) 215, which is coupled via connection 300 to allow reception of data from the portable CE device 100 having the corresponding data interface (I/F). The data received from the portable CE device 100 serve to configure the transponder memory 220. The data interface (I/F) 215 interfacing between reader logic 210 and the embodied cellular phone may be established by appropriate hardware and/or software interfaces. Additionally, the data interface (I/F) 215 may integrate a power interface, which is supplied with power by the coupled portable CE device 100 and energizes the RFID transponder as long as the portable CE device 100 provides power supply.

The transponder memory 220 stores the data and information, respectively, which is retrievable by a corresponding RFID reader. Accordingly, the transponder memory 220 is connected to transponder logic 210 and the transponder memory 220 is implemented as a configurable memory. Various storage technologies are available to implement a configurable memory and in particular non-volatile configurable storage technologies are applicable therefor. The configurable transponder memory 220 is under control of the transponder logic 210. Therefore, the transponder logic 210 is coupled via data interface (I/F) 215 to the data interface (I/F) of the portable CE device 100. Data received by the transponder logic via data interface (I/F) are supplied to the transponder memory 220 to be stored therein.

The RFID transponder module illustrated in FIG. 2b may be attached to or embedded in any portable CE device embodied herein as a cellular phone for the way of illustration. The RFID transponder module may be provided with a data interface (I/F) 215 such as a serial interface, a proprietary interface or any kind of known data interface, which is adapted to interface between the RFID transponder module and the embodied cellular phone having the data interface (I/F), which corresponds to the data interface (I/F) 215. Applications executed on the portable CE device, herein-embodied cellular phone, can use the functionality of the RFID transponder module. An application program interface (API) layer may support the communication between applications and the RFID transponder module.

It shall be noted that the embodiment of the RFID transponder module shown in FIG. 2b illustrates one possible embodiment thereof. The depicted (logic and memory) units shall represent functional units. Those skilled in the art will appreciate on the basis of the description given above that the functional units may be composed in another way while still allowing the functionality of the identification module.

In principle, the inventive concept introduces conceptually enhanced RFID transponder with a detection functionality, which is embodied as detector logic 240 in FIG. 2b. In general, the detection functionality serves to survey the operation of the RFID transponder. That means that the detection functionality indicates on a detected event relating to operational states of the RFID transponder logic to the portable CE device, to which the RFID transponder is coupled. A (detection) event shall be understood as any event, on the detection of which the detector logic is dedicated and adapted to signalize. In more detail, the detector logic is dedicated to sense for example the reception of an interrogating signal received via the antenna or the energizing of the transponder logic in response to an activation via an interrogating signal but also to sense the reading-out of the transponder memory for generating a response signal and/or the emitting of the response signal in consequence on activation. In addition, the detector logic may sense attenuation or deactivation of the RFID transponder logic, effected subsequently to the emission of the response signal. Further detection events can be implemented.

The indication may be issued as an indication signal, which may be supplied directly to the coupled portable CE device 100 or which may be transmitted via the transponder control logic 210 to the coupled portable CE device 100. FIG. 2b illustrates a direct connection 310, which allows the detector logic 240 to issue a detection signal directly to the coupled portable CE device 100 and the processing unit thereof, respectively. Alternatively, the depicted data interface (I/F) 215 may be adapted for supplying the detection signal to the coupled portable CE device 100 and the central processing unit thereof, respectively. Correspondingly, an event detected by the detection logic 240 may firstly be signalized to the transponder control logic 210 and the transponder control logic 210 may subsequently indicate to the data interface (IF) 215 to issue the detection signal.

For instance, whenever the antenna 230 of the RFID transponder is exposed to an adequate electromagnetic (radio frequency) field, i.e. an interrogating radio frequency signal having predefined frequency/frequencies, the RFID transponder is activated. In case of a passive RFID transponder, the RFID transponder is energized by the interrogating radio frequency (RF) signal. The activation is detected by the detector logic as a corresponding detection event, which is signalized to the coupled portable CE device 100.

Figure 2C:
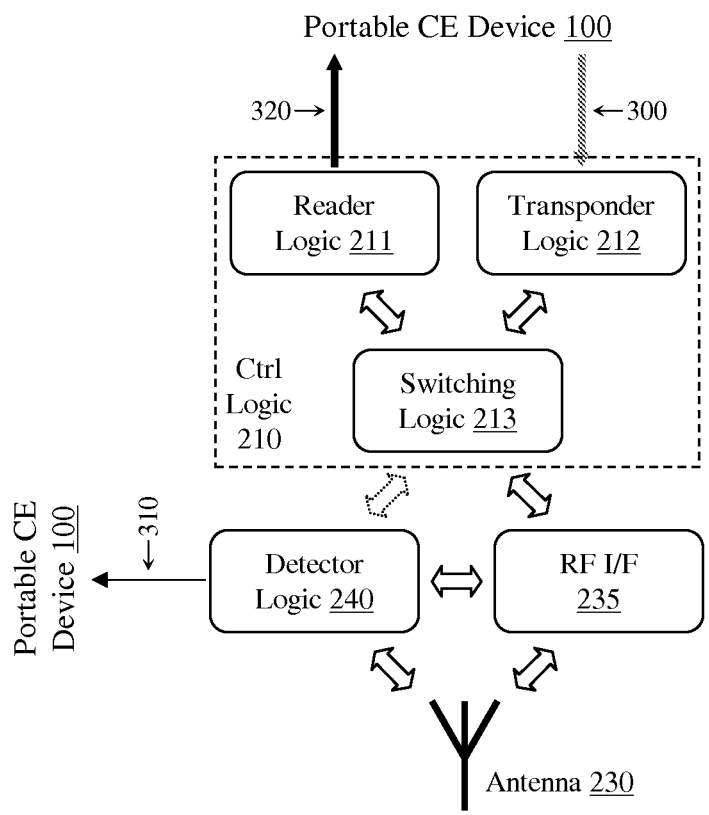
FIG. 2c shows schematically an implementation of an improved RFID module with a detector logic according to an embodiment of the present invention.

FIG. 2c shows a diagram of functional blocks, on the basis of which a RFID module with transponder functionality and reader functionality is realizable. The schematically illustrated RFID module includes a RFID reader logic 211, which shall represent the RFID reader functionality, and a RFID transponder logic 212, which shall represent the RFID transponder functionality. Both functional logic units, i.e. the RFID reader logic 211 as well as the RFID transponder logic 212, require a radio frequency (RF) interface (I/F) 235 (and a high frequency (HF) interface, respectively) and an antenna 230 adapted to the radio frequency (RF) deployed for operating. The embodiment illustrated in FIG. 2c purposes to use a common radio frequency (RF) interface (I/F) 235 and a common antenna 230 for utilisation by both functional logic units. It shall be understood that the radio frequency (RF) interface (I/F) 235 as well as the antenna 230, which are presented in the present description according to embodiment of the invention, are adapted to employ any suitable radio frequency/frequencies used in the field of RFID reader and transponders, respectively. In particular, at least typical operation frequencies aforementioned shall be realizable with the help of embodiments of the present invention.

In case of RFID reader functionality the antenna 230 is adapted to emit one or more interrogation signals and to receive one or more response signals for retrieving information from a RFID transponder.

In case of RFID transponder functionality the antenna 230 is adequate to receive one or more interrogation signals and to emit one or more response signals carrying information retrieved from the interrogated RFID transponder and transponder memory thereof, respectively.

The antenna 230 is connected to the radio frequency (RF) interface (I/F) 235 via one or more signal connections, which supply RF/HF signals generated by the radio frequency (RF) interface (I/F) 235 to the antenna 230 and which accepts RF/HF signals received by the antenna 230.

The radio frequency (RF) interface (I/F) 235 is responsible for both modulating and demodulating the signals to be transmitted and received by the antenna 230, respectively. Therefore, the radio frequency (RF) interface (I/F) 235 couples to the RFID reader logic 211 and the RFID transponder logic 212, respectively. In particular, the radio frequency (RF) interface (I/F) 235 receives from the RFID reader logic 211 signals to be modulated and transmitted and transmits demodulated signals to RFID reader logic 211. Additional, the radio frequency (RF) interface (I/F) 235 also transmits demodulated signals to the RFID transponder logic 211 and receives signals from the RFID transponder logic 211 to be modulated and transmitted. More particularly, the RF interface provides further signals necessary for the operation of the RFID transponder logic 211, which are in detail a power supply signal (voltage signal) and a clock signal. The power supply signal is gained from the coupling of the interrogating electromagnetic field, whereas the clock signal is obtained from the demodulator comprised in the radio frequency (RF) interface (I/F) 235. The power supply signal and the clock signal may obligate for operating the RFID transponder logic 212, respectively, especially in case the illustrated RFID module shall simulate a passive RFID transponder energized by an interrogating signal of a RFID reader device.

The RFID module illustrated in FIG. 2c comprises moreover a switching logic 213, which is operated to switch between RFID reader functionality and RFID transponder functionality. The switching logic 213 is interposed between RFID reader logic 211, RFID transponder logic 212 and radio frequency (RF) interface (I/F) 235 and operated with a switching input for being supplied with a switching signal generated by the portable CE device 100. In detail, the switching logic 213 is operable to couple either the RFID reader logic 211 to the radio frequency (RF) interface (I/F) 235 or the RFID transponder logic 212 to the radio frequency (RF) interface (I/F) 235. Correspondingly in dependence on the switching state or position of the switching logic 213, RFID reader functionality or RFID transponder functionality is available.

The RFID module and hence the RFID reader logic 211 is provided with an interface indicated by communication connections 320 to allow an application, which is operated on the portable CE device for communication with the RFID module and in particular with RFID reader logic 211, respectively. The interface interfacing between RFID module and the portable CE device is established by appropriate hardware and software interfaces that allow access to the RFID module.

The implemented RFID reader logic 211 allows for RFID reader functionality as described above. Additionally, the RFID reader logic 211 may be adapted for RFID writer functionality. That means, a RFID reader with reader functionality is adapted to retrieve information stored in one or more RFID transponders. The reader functionality is at least the basic functionality of a RFID reader. A RFID reader with writer functionality is adapted to add information to RFID transponders to be stored therein and/or modify information stored in RFID transponders. It shall be noted that the adding and/or modifying of information stored in RFID transponders depends on the capability of the RFID transponders and/or authorization of the RFID reader. The writer functionality is an enhanced functionality of a RFID reader.

The RFID transponder functionality as described above may be employed to establish a communication mode, which shall be denoted as show communication mode. In the show communication mode the RFID transponder functionality is switched while the RFID reader functionality is switched-off, i.e. is out of operation. The show communication mode is distinguished from the known communication modes therein that the RFID transponder functionality provides the physical advantage of passive RFID transponders, which do not require any internal power supply. The illustrated show communication mode primarily takes into account the requirement to provide for RFID transponder functionality even in case the RFID module is not energized by an external/internal power supply but energized by an interrogating signal, which can only server for a limited power supply. This means, the RFID transponder functionality may be active by default in case the RFID module is powered down and the RFID module operates with the RFID reader functionality in case the RFID module is powered up. In an embodiment of the invention, the portable CE device which comprises (internally or externally) the RFID module energizes the RFID module, in case the portable CE device is powered up (switched on). Consequently, in case the portable CE device is switched on, the RFID reader functionality is active and in case the portable CE device is switched off, the RFID transponder functionality is active. Nevertheless, the switching logic allows changing the functionality between RFID reader functionality and RFID transponder functionality at any time if required and in case the RFID module is energized.

The information stored in the RFID transponder module that can be retrieved by a RFID reader as illustrated above is stored in an adequate storage component such as a transponder memory (not illustrated). The storage component may be a read-only storage component or a configurable storage component. In case of a configurable storage component a number of storage technologies are applicable and in particular non-volatile configurable storage technologies are of interest.

The RFID module and hence the RFID transponder logic 212 may also be provided with an interface indicated by communication connections 300 to allow an application, which is operated on the portable CE device for supplying data to the RFID module and in particular to RFID transponder logic 212 having a transponder memory, respectively. The interface interfacing between RFID module and the portable CE device is established by appropriate hardware and software interfaces that allow access to the RFID module.

In analogy to FIG. 2b, it shall be assumed that the RFID module as embodied in FIG. 2c is attached to or embedded in a portable CE device 100. Conventionally, the RFID module may be provided with an interface such as a serial interface interfacing data exchanged between the RFID module and the portable CE device 100 such that applications executed on the portable CE device 100 can use the functionality, which is provided by the RFID module. An application program interface (API) layer may support the communication between applications operated on the portable CE device 100 and the RFID module.

As described above with reference to FIG. 2a and FIG. 2b, the detection functionality generally serves to survey the operation of the RFID transponder. With respect to FIG. 2c, the detection functionality serves to survey the operation of the RFID module and in particular the operation of the RFID module being operated with transponder functionality (i.e. transponder mode). That means that the detection functionality indicates on a detected event relating to operational states of the RFID transponder logic 212 to the portable CE device 100, to which the RFID module is coupled. In analogy to the description above, a (detection) event shall be understood as any event, on the detection of which the detector logic is dedicated and adapted to signalize. In more detail, the detector logic 240 is dedicated to sense for example the reception of an interrogating signal received via the antenna or the energizing of the transponder logic in response to an activation via an interrogating signal but also to sense the reading-out of the transponder memory for generating a response signal and/or the emitting of the response signal in consequence on activation. Further detection events can be implemented.

In order to sense the reception of an interrogating signal received via the antenna or the energizing of the transponder logic in response to an activation via an interrogating signal, the detector logic 240 may be connected to the radio frequency (RF) interface (I/F) 235 or the antenna 230, upon which the reception of the interrogating signal or the energizing of the transponder logic is detectable. Alternatively, the detector logic 240 can be also coupled to the transponder logic for sensing those events and/or for sensing further events such as aforementioned.

The indication may be issued as an indication signal, which may be supplied directly to the coupled portable CE device 100 or which may be transmitted via the transponder logic 210 to the coupled portable CE device 100. FIG. 2b illustrates a direct connection 310, which allows the detector logic 240 to issue a detection signal directly to the coupled portable CE device 100 and the processing unit thereof, respectively. Alternatively, the data interface (I/F) (not shown) may be adapted for supplying the detection signal to the coupled portable CE device 100 and the central processing unit thereof, respectively. Correspondingly, a detected event of the detection logic 240 may firstly be signalized to the transponder logic 212 and the transponder logic 212 may subsequently indicate to the data interface (IF) to issue the detection signal.

For instance, whenever the antenna 230 of the RFID module is exposed to an adequate electromagnetic (radio frequency) field, i.e. an interrogating radio frequency signal having predefined frequency/frequencies, the RFID transponder is activated. In case of a passive communication mode, the RFID module is energized by the interrogating radio frequency (RF) signal. The activation is detected by the detector logic 240 as a corresponding detection event, which is signalized to the coupled portable CE device 100 via signal connection 310.

Figure 3A:
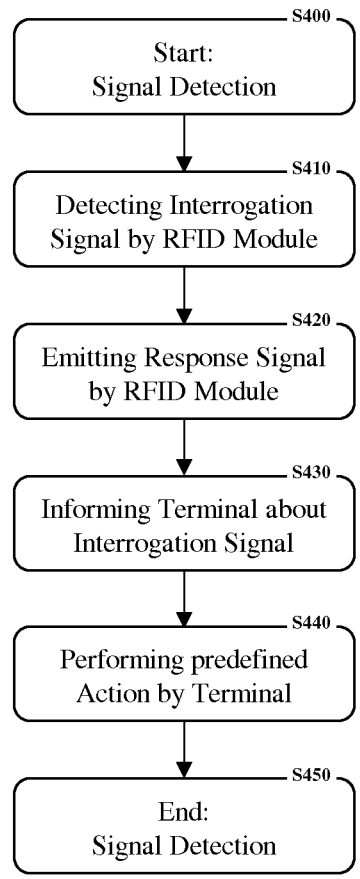
FIG. 3a shows schematically a flow chart comprising a first operational sequence according to an embodiment of the present invention.
Figure 3B:
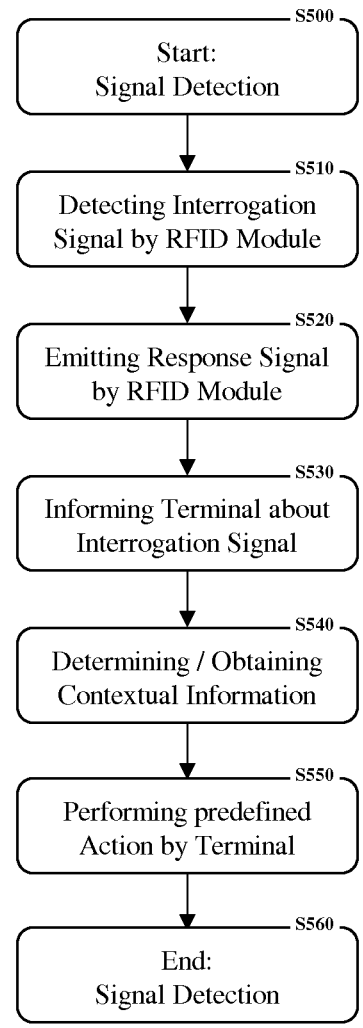
FIG. 3b shows schematically a flow chart comprising a second operational sequence according to an embodiment of the present invention.

With reference to FIGS. 3a and 3b, operational sequences according to embodiments of the present invention will be illustrated, which relate to the operation of a detector logic being provided in conjunction with a RFID module or transponder and portable CE device, being connected to the RFID module and transponder, respectively. The operational sequences illustrated in FIGS. 3a and 3b are operable with the embodiments shown in FIGS. 2a to 2c.

More particularly, the inventive methodology according to the present invention provides for one or more operations of the portable CE device, which operations are operable in response to the signalized detection event issued by the detector logic. In principle, the operations to be operable in response to a detection event are operable within a current context in accordance with which the detection event has been detected. Two distinct ways for determining context information relating to the current context shall be discussed. The first way is based on context information resulting from the information, which is provided by the radio frequency identification (RFID) module and transponder, respectively, whereas the second way is based on context information acquired with the help of other context acquisition means for obtaining context information in order to defined the current context.

For instance, two basic use cases shall be referred to, with the help of which the operational sequences are described in order to ease the understanding. In a first use case, the detector logic embodied as back-end logic of a RFID transponder is employed in conjunction with various RFID-based transaction application for providing input to the portable CE device for enhancing security and privacy aspects, which are for example essential in numerous RFID-based ticketing/payment applications. In a second use case, the detector logic embodied as back-end logic of a RFID transponder is employed in conjunction with RFID-based service applications. The detector logic serves for an input to the portable CE device for enhancing initiation and use of the service applications.

With reference to FIG. 3a, the detection event handling according to an embodiment of the present invention starts in an operation S400. That means the detector logic surveys the operation of the RFID transponder and RFID module, respectively, in order to detect a detection event such as defined above.

In an operation S410, the RFID transponder/module is arranged within the coverage area of for instance a RFID reader, which emits interrogating signals. Accordingly, the detector logic detects a detection event, for instance the reception of the emitted interrogating signal and activation in response to the reception of the interrogating signal, respectively.

In an operation S420, the RFID transponder or RFID module operates in accordance with its functionality and emits a radio frequency (RF) response signal in consequence of the activation/energizing of the RFID transponder and RFID module, respectively. The response signal carries data stored in the transponder memory and read-out therefrom for being emitted via the antenna.

In an operation S430, the portable CE device receives a detection signal originated from the detector logic. The detection signal informs the portable CE device about the detection event, upon which is has been issued.

Conventionally, the portable CE device being equipped with the RFID module/transponder, i.e. the RFID module/transponder is attached to, included in, embedded in or coupled to the portable CE device (c.f. FIGS. 2a to 2c), may have control over the data stored in the RFID module/transponder in case of a configurable transponder memory. However, once data is stored in the transponder memory, the portable CE device is no longer involved in the operation of the RFID module/transponder. Conveniently, the detection signal originated from the detector logic provided with the RFID module/transponder according to an embodiment of the present invention serves/supplies a detection signal informing about the activity of the RFID module/transponder.

In an operation S440, the portable CE device receives the detection signal, informing about the detection event, upon which the detection signal has been issued. Example events have been described above in detail; herein the detection signal indicates the reception of an interrogating signal by the RFID transponder/module. In knowledge about a detected event indicated by the detection signal, the portable CE device is capable to process and/or to react in accordance with predefined operations.

As aforementioned, the context, which defines the predefined operations to be processed in response to the received detection signal, is determined in accordance with the data stored in the transponder memory and transmitted by the RFID transponder/module. In particular, the type of data stored in the RFID transponder/module and the contents of the stored data serve as context information, respectively. The portable CE device maintains for example a database, a list etc comprising associations between types of data and corresponding predefined operations to be processed. In general, the type of data and the data, respectively, which is stored in the RFID module/transponder defines in an inherent way the context, i.e. serves as context information. This means, the database, the list etc maintained by the portable CE device comprises associations between defined contexts and corresponding predefined operations to be processed by the portable CE device in response to the detection signal.

In an operation S450, the detection event handling according to an embodiment of the present invention is finished.

In order to enlighten the above-described operational sequence referred to in FIG. 3a, example use cases shall be presented.

The RFID transponder/module shall be used for providing ticket or payment related information; i.e. information about an electronic ticket or information about any means of payment (credit card, cash card, etc). Such information is sensitive since personal information may be comprised thereof. Whereas the provision of the ticket or payment related information via the RFID transponder/module is normally under control of the user of the RFID transponder/module, the user has to rely on external information about the reading-out of the provided information. In accordance with the external information the user can decide whether the provided information can be withdrawn or not. For privacy aspect, sensitive information shall only be provided as long as absolutely required. But the user cannot be sure that the external information is reliable. In accordance with the inventive concept provided and the detection signal supplied to the portable CE device, the user may be informed about the reading-out of the ticket or payment related information, the provision of the ticket or payment related information is automatically withdrawn or the user can manually instruct to remove the provision of the information.

With reference to the example use case briefly illustrated, the predefined operations may be defined in conjunction with the configuration of the transponder memory with data for provision thereby. This means, simultaneously to the configuration RFID transponder/module for providing ticket or payment related information, the subsequent withdrawal operation in response to the indication of the activation of the RFID transponder/module by a RFID reader is defined.

Moreover, the portable CE device may initiate an application in response to the detection signal, for instance a communication application is started, which establishes a wireless data communication connection, which could be used to check whether the information provided by the RFID transponder/module has been transmitted correctly. Such a wireless data communication connection may comprise a Bluetooth connection, a WLAN (wireless local area network) connection, an IRDA (infrared data association) connection etc.

With reference to FIG. 3b, the detection event handling according to an embodiment of the present invention starts in an operation S500. The following operations S510 to S530 correspond essentially to the operations S410 to S430 described above. That means the detector logic surveys the operation of the RFID transponder or RFID module in order to detect a detection event such as defined above. In contrast to the operational sequence illustrated with reference to FIG.

3a, the embodiment of the present operational sequence relates to the utilisation of other or additional context acquisition means, which allow acquisition of context information, on the basis of which the current context is definable.

In an operation S510, the RFID transponder/module is arranged within the coverage area of for instance a RFID reader, which emits interrogating signals. Accordingly, the RFID transponder/module is energized and activated by the interrogating signal, respectively.

In an operation S520, the RFID transponder or RFID module operates in accordance with its functionality and emits a radio frequency (RF) response signal in consequence of the activation or energizing of the RFID transponder and RFID module, respectively. The response signal carries data stored in the transponder memory and read-out therefrom for being emitted via the antenna.

In an operation S530, the portable CE device receives a detection signal originated from the detector logic. The detection signal informs the portable CE device about the detection event, upon which is has been issued.

Herein, the detection signal originated from the detector logic provided with the RFID module/transponder according to an embodiment of the present invention serves/supplies a detection signal informing about for instance the attenuation of the RFID module/transponder, which is detected after completion of the emission and subsequent deactivation of the RFID module/transponder in accordance with the above operation S520.

The portable CE device receives the detection signal in response to a detected event, upon which the detection signal has been issued. In knowledge about the detected event indicated by the detection signal, the portable CE device is capable to process and/or to react in accordance with predefined operations.

In an operation S540, the portable terminal determines, in which context it is currently operated and in which context the detection signal is issued.

As described briefly above, the portable terminal may be in knowledge about the information and data currently stored in the RFID transponder/module, respectively. For instance, the stored information/data have been configured previously by the portable terminal. Correspondingly, the type of information is known. Correspondingly, the one or more subsequent operations (referred to in operation S550 below) can be defined, adapted and planned with respect to the known type of information. As aforementioned this means for example that sensitive information stored in the RFID transponder/module can be revoked immediately after retrieval thereof, the portable CE device may be switched on, switched off or switched into a defined operation mode, a user interface may be configured to provide a selection of operations to be manually initiated by the user of the portable CE device, etc. Alternatively, the portable CE device may be instructed to initiate as predefined application or to close a predefined application. The number of possible reactions onto the detection signal may be continued.

Further, the context in which the portable terminal is currently operated may be acquired in any other suitable way. In particular, the context may be determined or concluded from information provided and served by external entities. Such information which allows obtaining the operational context, on the basis of which the operation of the portable CE device is adaptable, shall be designated as context information, whereas the operation of the portable CE device based thereon is designated as context awareness.

The acquisition and processing of contextual information is described in detail with reference to FIGS. 4a and 4b.

In an operation S550, the portable CE device is provided with several predefined operations for being performed subsequent to the reception of the detection logic. In order to select one or more appropriate predefined operations from the several predefined operations, the portable CE device refers to the contextual information, on the basis of which a selection is operable. Afterwards, the selected operation(s) are subsequently performed. In analogy to the operation S440, the portable CE device maintains for example a database, a list etc comprising associations between defined contexts and corresponding predefined operations to be processed by the portable CE device in response to the detection signal.

In an operation S560, the detection event handling according to an embodiment of the present invention is finished.

Contextual information, context information or context-related information may be understood as any information, on the basis of which conclusions can be drawn about the actual context, in which the portable CE device is currently operated. This means, the contextual information is suitable for performing the above-described selection operation.

It shall be noted that two ways for determine an adequate context have been illustrated above. The one way to determine context is to check the context in which the RFID transponder/module operates. The other way to determine the context utilised other means for defining context from the environment in accordance with contextual information. As a result, the context may also be defined by a combination of the two illustrated ways of context determinations. For example, although the portable CE terminal has determined a current context such as movie theater, the selection of the proper action should be based on the RFID transponder/module contents. When for example providing a device address via the RFID transponder/module, setting the Bluetooth module to paging is preferred of over setting the terminal into silent mode, which may be preferred subsequently upon detecting that the RFID module/transponder comprises data relating to a movie ticket.

The acquisition and processing of contextual information will be described with respect to FIGS. 4a and 4b, which illustrate schematically implementations concerning the portable CE device and implementations relating to external source entities serving the contextual information.

Figure 4A:
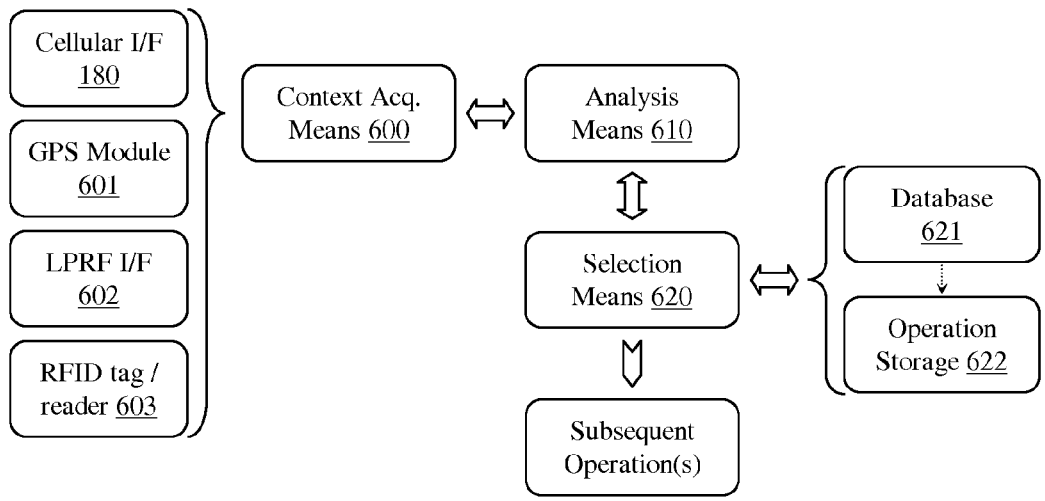
FIG. 4a shows schematically implementations concerning a portable CE device.
Figure 4B:
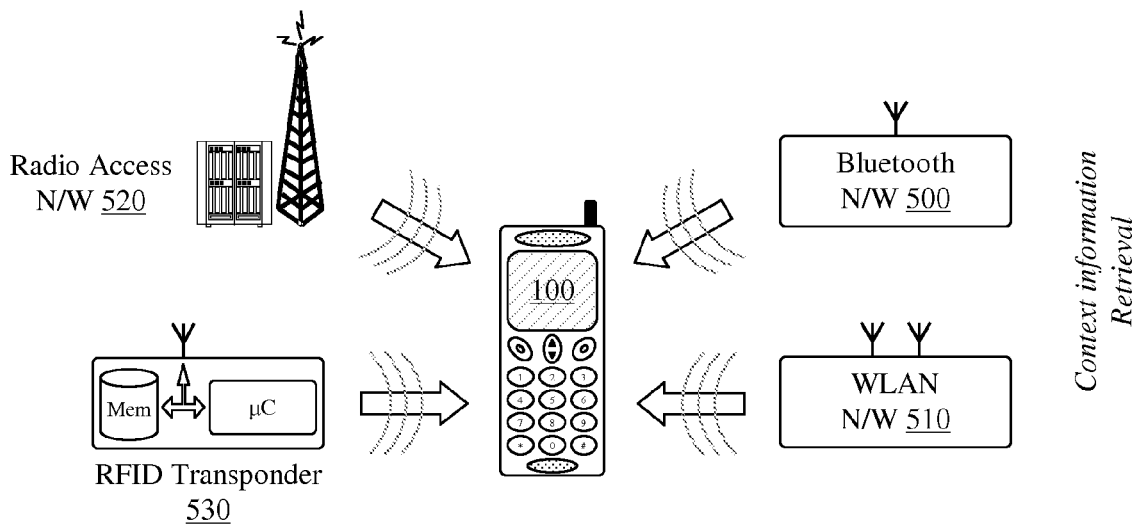
FIG. 4b shows schematically implementations relating to external source entities serving contextual information.

With reference to FIG. 4a, functional components and units, respectively, which are implemented in the portable CE device, are depicted comprising a context information acquisition means 600, an analysis means 610, and a selection means 620, the inter-cooperation of which allow to carry out the method context-related operation of the portable CE device as described in the operation S550. The context information acquisition means 600 shall represent several distinct means, which allow acquisition of suitable contextual information. In detail, the context information acquisition means 600 may be operable with the cellular interface 180 for cellular communications with a radio access network (N/W) 520, a low power radio frequency (LPRF) interface 602 such as the Bluetooth transceiver with a Bluetooth network (N/W) 500, a WLAN transceiver with a the WLAN network (N/W) 510, the ultra wideband (UWB) transceiver and any other transceiver operable with IEEE 802.xx standards for wireless data communications with a corresponding network. Alternatively, the context information acquisition means 600 may be the RFID transponder or reader 603 as aforementioned or may be a sensor means such as the GPS module 601. It shall be noted that the enumeration of the context information acquisition means 600 presented above is not limiting, a portable CE device operable with the present invention may be coupled internally or externally to one or more of the means illustrated above and/or may be coupled internally or externally to one or more means, which are adapted for obtaining suitable contextual information.

The context information acquisition means 600 is operable to obtain contextual information. In detail, the environment may be scanned (repeatedly) for (externally provided) information being employable as context-related information, on the basis of which (automated) selection may be operated. Suitable context-related information comprises several content types of information, which contents relate to different original purposes. Suitable context-related information might comprise at least location information, location-related information, location-based information and dedicated information, respectively.

The scanning operation should be understood as a passive scanning operation and an active scanning operation, respectively. During passive scanning, a context information acquisition means is adapted, configured or provided to obtain the context-related information, the supplying of which is initiated by an external source. That means that the context information acquisition means may be configured to be ready-to-receive context-related information. During active scanning, a context information acquisition means is adapted, configured or provided to actively obtain the context-related information by for instance active transmitting of one or more signals (e.g. interrogation signals), upon which initiates the supplying of the context-related information is operable.

The location information and location-related information primarily code a geographical position or an indication of place of the user using the location service. The location-based information primarily codes information, which are obtained on the basis of a location information. Location information and location-related information may be obtained via a cellular network implementing location service and location-based services, respectively. Alternatively, location information relating to a position information can also be obtained from global positioning system (GPS) signals received by a global positioning system (GPS) module. Such position information allows identifying a certain location/position e.g. a movie theater etc. The dedicated information shall be understood as information, which refer to predefined operations and which codes one or more instructions, in accordance with which the operations can be referenced.

The context information obtained by the context information acquisition means 600 is then supplied to the analysis means 610, which is adapted to analyze the obtained contextual information. The analyzing operation depends and is based on the contents of the contextual information, which is obtained before. As aforementioned, the contents of the contextual information can differ significantly such that provisions may have been taken to enable the analyzing operation.

Referring back, the dedicated information comprising one or more instructions for referencing predefined operations is analyzed to result in a decoding of the one or more instructions comprised. The location information, location-related information and location-based information are analyzed to result in an association information, by the means of which operations are identifiable. The identification of the corresponding operations may be obtained by comparing the association information with a data item comprised in the operations in question or may be obtained by comparing the association information with a corresponding supplementary association information assigned to the operations in question.

On the basis of the analysis results, one or more operations are to be selected from a plurality of predefined operations maintained by the portable CE device. A selection means 620 is adapted to select one or more operations from the plurality of predefined operations stored by the portable CE device.

According to an embodiment of the invention, contextual information input from various acquisition means such as the aforementioned low power radio frequency (LPRF) interface 602, cellular interface 180, global positioning system (GPS) module 601 RFID transponder/reader 603 etc, which is received by a dedicated software or a dedicated logic comprising the analysis means 610 and the selection means 620 coupled to e.g. an association database 621 and a operation storage 622. The association database 621 includes associations of various contextual information inputs with operation indications or references. That means that the indication and references constitute an association between current contextual information supplied and one of the predefined operations stored. The constitution of the association is obtained by employing an adequate association algorithm. After making the association, the dedicated software or logic retrieves the selected operations associated with current contextual information for being performed.

The analysis means 620 and the selection means 630 may represent program code sections, each including program codes, which, when carried out by a corresponding processing means such as a processor, controller and the like, perform the corresponding operations. Moreover, the aforementioned means comprising the analysis means 620 and the selection means 630 may represent one or more logic circuits, which are adapted to perform the corresponding operations.

Use Case

Finally, a complex use case shall further enlighten both described operational sequences according to embodiments of the present invention.

It should be assumed a use case relating to the purchase and utilisation of a movie ticket. The user has a portable CE device in the form of a cellular terminal equipped with a RFID module as embodied above. Firstly, the user contacts a web site dedicated for selling electronic movie tickets, purchases an electronic ticket and a dedicated service application in the cellular terminal configures the memory of the RFID module. The ticket might have been purchased e.g. over the cellular network interface implemented in the cellular terminal. In response to the purchase of the electronic movie ticket the RFID module might include various contents, such as for example:

Terminal identification information, which is set as "always on" meaning, i.e. default setting, that the RFID transponder/module provides e.g. a an address identifier or an alias address relating to a low power radio frequency (LPRF) interface comprised by the cellular terminal if no other instructions are set;

30-days bus ticket, which is set as "hidden" until detecting suitable environment/context (e.g. a bus-stop or entering into a bus); and this newly acquired electronic movie ticket.

It is getting late and the user decides to take a bus to ensure that he will get to the movie theater in time. He walks to nearby bus-stop and scans with the RFID module of the cellular terminal a RFID transponder provided at the bus-stop, which automatically provides a connection to bus-timetable service. Timetable service is downloaded and a suitable bus is just coming. Simultaneous to the operation of scanning the RFID transponder at the bus-stop, the context of the cellular terminal is changed to "bus-stop"; i.e. the information acquired in conjunction with the RFID transponder at the bus-stop serves as contextual information. When the suitable bus arrives, the user just holds the cellular terminal with RFID module close to ticket redemption machine, and the machine reads the bus-ticket information from the cellular terminal. (This operation might include first reading a RFID transponder from the ticket redemption machine to ensure that the current context is "bus", and only thereafter the bus-ticket information is available at the RFID module.)

The detection logic detects the RFID reading operation and decision is made that bus-ticket information is currently activate, so the cellular terminal instructs the RFID module to remove the bus-ticket information from the RFID module. Afterwards, the terminal sets back to the aforementioned default setting to be readable, i.e. the address identifier or alias addresses information. This operation is preferably performed in accordance with the embodiment described with respect to FIG. 3a.

In the bus, the user speaks with another user sitting on close seat and they decide to play a multiplayer tennis game. The bus is crowded, so the easiest way to establish a short-range connection for playing the game is to get the devices into close approximation and the other user reads-out the address identifier (or alias address information) from the RFID module by a corresponding RFID module implemented in a cellular terminal of the other user.

The detection logic detects the RFID reading operation and a decision is made that address identifier (or alias address information) is currently activate, so the cellular terminal instructs the low power radio frequency (LPRF) module (e.g. Bluetooth/WLAN interface) of the cellular terminal to enter into page scanning mode, and the cellular terminals initiate rapidly a low power radio frequency (LPRF) connection. This operation is preferably performed in accordance with the embodiment described with respect to FIG. 3b.

After leaving the bus, the user enters the movie theater, and a local service providing low power radio frequency (LPRF) access point (e.g. a Bluetooth/WLAN access point) contacts the cellular terminal of the user and the cellular terminal uses that information as contextual information to set the current context to "movie theater", which results in making the electronic movie ticket information available. When user enters the theater hall, he redeems his electronic movie ticket by showing his cellular terminal to entrance gate, which validates the electronic movie ticket and the detection logic provided with the RFID module of the cellular terminal signalizes that the electronic movie ticket information is redeemed, which is used by the mobile terminal to initiate the configuration of the cellular terminal into silent mode operation, or to activate a movie theater application, which might provide further information relating to the available films or like. This operation is preferably performed in accordance with the embodiment described with respect to FIG. 3b.

Additionally, there is always a possibility that the ticket information was misread for some reason. This could be remedied at least partly if the cellular terminal has e.g. other short-range communication means, such as a low power radio frequency (LPRF) interface, which could be used to initiate a short-range communication connection with the ticket redemption machine to ensure that the ticket information provided through the RFID module was correctly read-out. This could be implemented e.g. by the cellular terminal asking from the ticket redemption machine whether a particular customer number is validated. If not, then the cellular terminal could provide a sensible alert to the user to reinsert the information to the RFID reader of the ticket redemption machine. It should be noted that also other solutions might be used (e.g. a green light in the ticket redemption device when information has been correctly read-out).

Comprehensively, the inventive concept is based on the "back-coupling detection logic", which provides means for the logic of the RFID transponder and RFID module, respectively, to inform the coupled portable CE device and processing unit (CPU) thereof, respectively, that information stored in the RFID transponder/module is read-out. Afterwards the processing unit (CPU) could check the type of information which has been read or could check the actual context in which the information has been read out, and activates, initiates, opens, wakes up applications, functions or operations that are associated with the read-out information.

The invention claimed is:

1. An apparatus comprising:
   a physical interface configured to connect a radio frequency identification device to the apparatus, wherein the apparatus is configured to host the radio frequency identification device;
   a processor; and
   a memory, the memory comprising computer program code stored thereon, the memory and the computer program code being configured to, when executed by the processor, cause the apparatus to:
   receive a detection signal issued by said radio frequency identification device through said physical interface in response to a detected event relating to an operation of said radio frequency identification device relating to communication of data with an external device over radio frequency communication, wherein said detection signal informs said apparatus of said operation of said radio frequency identification device;
   determine a current operational context of the apparatus; and
   initiate an application in response to receipt of the detection signal and the current operational context of the apparatus indicating that initiation of said application is appropriate.

2. The apparatus according to claim 1, wherein said application is at least one of a payment application and a ticketing application.

3. The apparatus according to claim 1, wherein said operation of said radio frequency identification device is performed without requiring any input from the apparatus.

4. The apparatus according to claim 1, further comprising one or more associations between several contexts and a plurality of operations of the apparatus, wherein said associations enable said apparatus to select one or more operations from said plurality of operations.

5. The apparatus according to claim 4, wherein said one or more operations of the apparatus are predefined and said one or more predefined operations relate to at least one application.

6. The apparatus according to claim 1, wherein the current operational context of the apparatus is determined from type information about said data, which is transmitted by said radio frequency identification device, wherein said type information relates to contents of said data.

7. The apparatus according to claim 1, wherein the current operational context of the apparatus is determined by obtaining the current operational context of the apparatus from external source entities and/or from information provided by said external source entities.

8. The apparatus according to claim 1, wherein said apparatus is a portable consumer electronic device.

9. A method comprising:
receiving, at an apparatus, a detection signal issued by a radio frequency identification device hosted by said apparatus in response to a detected event relating to an operation of said radio frequency identification device relating to communication of data with an external device over radio frequency communication, wherein said detection signal informs said apparatus of said operation of said radio frequency identification device;
determining a current operational context of the apparatus; and
initiating an application in response to receipt of the detection signal and the current operational context of the apparatus indicating that initiation of said application is appropriate.

10. The method according to claim 9, wherein said application is at least one of a payment application and a ticketing application.

11. The method according to claim 9, further comprising establishing one or more associations between several contexts and a plurality of operations of the apparatus, wherein said associations enable said apparatus to select one or more operations from said plurality of operations.

12. The method according to claim 11, wherein said one or more operations of the apparatus are predefined and said one or more predefined operations relate to at least one application.

13. The method according to claim 9, wherein the current operational context of the apparatus is determined from type information about said data, which is transmitted by said radio frequency identification device, wherein said type information relates to contents of said data.

14. The method according to claim 9, wherein the current operational context of the apparatus is determined by obtaining the current operational context of the apparatus from external source entities and/or from information provided by said external source entities.

15. A computer program product comprising a non-transitory machine-readable medium having program code stored thereon, which when executed by a processor, causes an apparatus to perform the method of claim 9.

16. A system comprising:
an apparatus comprising:
a physical interface configured to connect a radio frequency identification device to the apparatus;
a processor; and
a memory, the memory comprising computer program code stored thereon, the memory and the computer program code being configured to, when executed by the processor, cause the apparatus to:
receive a detection signal issued by said radio frequency identification device through said physical interface in response to a detected event relating to an operation of said radio frequency identification device relating to communication of data with an external device over radio frequency communication, said detection signal informing said apparatus of said operation of said radio frequency identification device;
determine a current operational context of the apparatus; and
initiate an application in response to receipt of the detection signal and the current operational context of the apparatus indicating that initiation of said application is appropriate,
the system further comprising:
said radio frequency identification device, wherein said radio frequency identification device comprises:
a controller logic;
a memory coupled with the controller logic and configured to store data retrievable by an external radio frequency identification device; and
a radio frequency interface configured to receive a radio frequency interrogating signal from the external radio frequency identification device, in response to which said controller logic is configured to supply data from said coupled memory to said radio frequency interface to cause transmission of a radio frequency response signal carrying said data without requiring any input from the apparatus,
and wherein said radio frequency identification device further comprises a detector logic configured to provide a detection signal to the apparatus through the physical interface responsive to a detected event relating to an operation of said radio frequency identification device.

17. The system according to claim 16, wherein said radio frequency identification device is operable with radio frequency identification reader functionality and radio frequency identification transponder functionality.

18. The system according to claim 17, wherein said radio frequency identification device is operable with radio frequency identification transponder functionality to emulate a radio frequency identification transponder.

19. The system according to claim 16, wherein said detector logic is provided integrally to one of said radio frequency interface and said controller logic of said radio frequency identification device.

20. The system according to claim 16, wherein said application is at least one of a payment application and a ticketing application.

* * * * *